United States Patent
Rodgers et al.

(10) Patent No.: US 9,680,805 B1
(45) Date of Patent: Jun. 13, 2017

(54) METHOD AND SYSTEM FOR KEY MANAGEMENT

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 42 days.

(21) Appl. No.: 14/705,887

(22) Filed: May 6, 2015

Related U.S. Application Data

(60) Provisional application No. 61/989,957, filed on May 7, 2014.

(51) Int. Cl.
*H04L 9/00* (2006.01)
*H04L 29/06* (2006.01)
*G06F 9/455* (2006.01)

(52) U.S. Cl.
CPC ........ *H04L 63/061* (2013.01); *G06F 9/45558* (2013.01); *H04L 63/0428* (2013.01); *G06F 2009/45587* (2013.01)

(58) Field of Classification Search
CPC ....... H04L 9/08; H04L 63/061; H04L 63/062; H04L 63/0428; G06F 21/44; G06F 21/45; G06F 9/45558
(Continued)

(56) References Cited

U.S. PATENT DOCUMENTS 6,347,145 B2 * 2/2002 Kato .............................. 380/278
6,748,084 B1 * 6/2004 Gau ........................ H04L 9/085
380/277
(Continued)

OTHER PUBLICATIONS

Trusted Platform Module Library, Part 1: Architecture; Family "2.0" Level 00 Revision 00.96; Mar. 15, 2013, 267 pages.
(Continued)

*Primary Examiner* — Ho Song
(74) *Attorney, Agent, or Firm* — Osha Liang LLP

(57) ABSTRACT

A method and system for key management. The method includes receiving, by a control domain on a server, a request for a tenant key, and obtaining an authorization secret from a management service, where the management service is external to the server. The method further includes, in response to the request, decrypting, after obtaining the authorization secret, an encrypted platform master key to obtain a platform master key, decrypting an encrypted tenant key to obtain the tenant key using the platform master key, and providing the tenant key to an entity that issued the request.

17 Claims, 10 Drawing Sheets

(58) Field of Classification Search
USPC .......... 380/277, 281, 284, 44; 713/171, 189; 726/17, 18
See application file for complete search history.

(56) References Cited

U.S. PATENT DOCUMENTS

| | | | |
|---|---|---|---|
| 7,499,551 B1 * | 3/2009 | Mire | ................ H04L 9/006 380/277 |
| 7,516,331 B2 * | 4/2009 | Jin | ................ G06F 21/51 713/187 |
| 7,653,202 B2 * | 1/2010 | Randell | ............ G06F 21/6209 380/284 |
| 7,870,153 B2 | 1/2011 | Croft et al. | |
| 7,886,023 B1 | 2/2011 | Johnson | |
| 8,010,679 B2 | 8/2011 | Low et al. | |
| 8,051,180 B2 | 11/2011 | Mazzaferri et al. | |
| 8,166,261 B1 | 4/2012 | Cremelie et al. | |
| 8,218,828 B2 | 7/2012 | Iasso | |
| 8,438,654 B1 | 5/2013 | von Eicken et al. | |
| 8,509,449 B2 * | 8/2013 | Ureche | ............... G06F 21/602 380/281 |
| 8,572,389 B2 * | 10/2013 | Little | ............... G06F 21/6245 380/277 |
| 8,572,400 B2 | 10/2013 | Lin et al. | |
| 8,607,054 B2 | 12/2013 | Ramarathinam et al. | |
| 8,661,252 B2 | 2/2014 | Chandwani | |
| 8,959,108 B2 | 2/2015 | Pereira et al. | |
| 9,495,379 B2 | 11/2016 | Zhang et al. | |
| 2010/0088405 A1 | 4/2010 | Huang et al. | |
| 2011/0162042 A1 | 6/2011 | Xiao et al. | |
| 2012/0151209 A1 | 6/2012 | Visnyak et al. | |
| 2013/0185715 A1 | 7/2013 | Dunning et al. | |
| 2013/0205376 A1 | 8/2013 | Narasimha et al. | |
| 2014/0101113 A1 | 4/2014 | Zhang et al. | |
| 2014/0281500 A1 | 9/2014 | Ignatchenko | |
| 2014/0297779 A1 | 10/2014 | Pack et al. | |
| 2014/0344475 A1 | 11/2014 | Chen et al. | |
| 2015/0007250 A1 | 1/2015 | Dicato, Jr. et al. | |
| 2015/0215308 A1 | 7/2015 | Manolov et al. | |
| 2016/0021055 A1 | 1/2016 | Krzywonos et al. | |

OTHER PUBLICATIONS

Office Action issued in related U.S. Appl. No. 14/705,589, dated Dec. 29, 2016 (29 pages).

* cited by examiner

METHOD AND SYSTEM FOR KEY MANAGEMENT

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Systems may store encryption keys that are used to secure content and/or communication.

SUMMARY

In general, in one aspect, the invention relates to a method for key management. The method includes receiving, by a control domain on a server, a request for a tenant key, and obtaining an authorization secret from a management service, where the management service is external to the server. The method further includes, in response to the request, decrypting, after obtaining the authorization secret, an encrypted platform master key to obtain a platform master key, decrypting an encrypted tenant key to obtain the tenant key using the platform master key, and providing the tenant key to an entity that issued the request.

In general, in aspect, the invention relates to a system including a server. The server includes storage, a first trusted platform module (TPM), and a control domain executing on the server. The storage includes a key store. The control domain executing on the server is configured to receive a request for a tenant key and to obtain an authorization secret from a management service. An encrypted tenant key is stored in the key store. The management service is external to the server. The control domain executing on the server is further configured to, in response to the request, after obtaining the authorization secret, initiate decryption of an encrypted platform master key by the first TPM in order to obtain a platform master key, initiate decryption of the encrypted tenant key to obtain the tenant key using the platform master key, and provide the tenant key to an entity that issued the request. The encrypted platform master key is stored in the key store.

In general, in one aspect, the invention relates to a non-transitory computer readable medium comprising computer readable program code, which when executed by a computer processor enables the computer processor to receive, by a control domain on a server, a request for a tenant key, provide at least one integrity measurement for the server to the management service prior to receiving the request and prior to obtaining an authorization secret, and obtain the authorization secret from a management service, where the management service is external to the server. The computer readable program code further enables the computer processor to, in response to the request, decrypt, after obtaining the authorization secret, an encrypted platform master key to obtain a platform master key, decrypt an encrypted tenant key to obtain the tenant key using the platform master key, and provide the tenant key to an entity that issued the request.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to implementing a key store in a system. More specifically, embodiments of the invention relate to implementing a key store in one or more computing devices where access to the key store is managed by the management service.

Figure 1A:
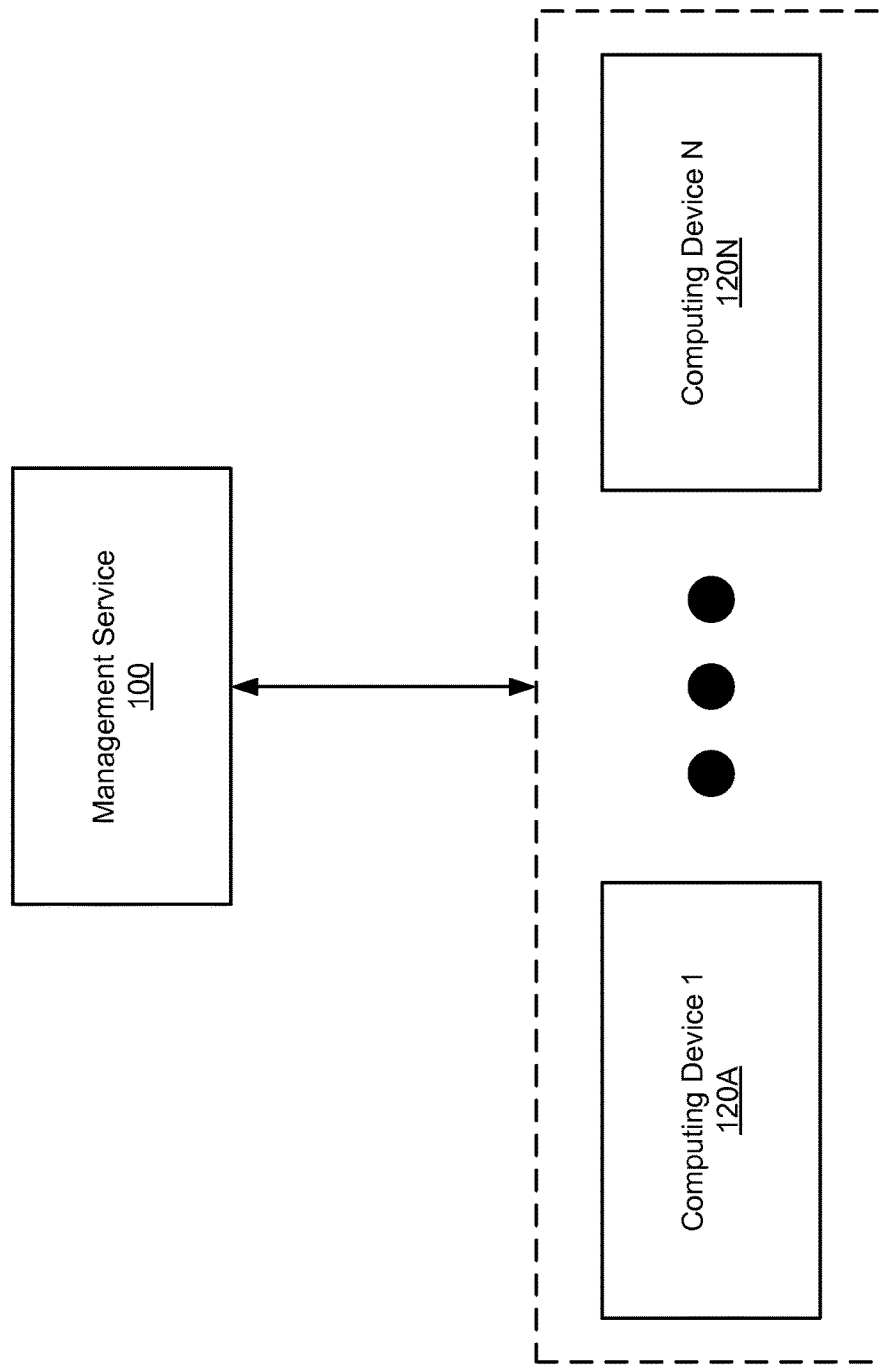
FIGS. 1A-1C show systems in accordance with one or more embodiments of the invention.

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 6 and 7).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

Figure 1B:
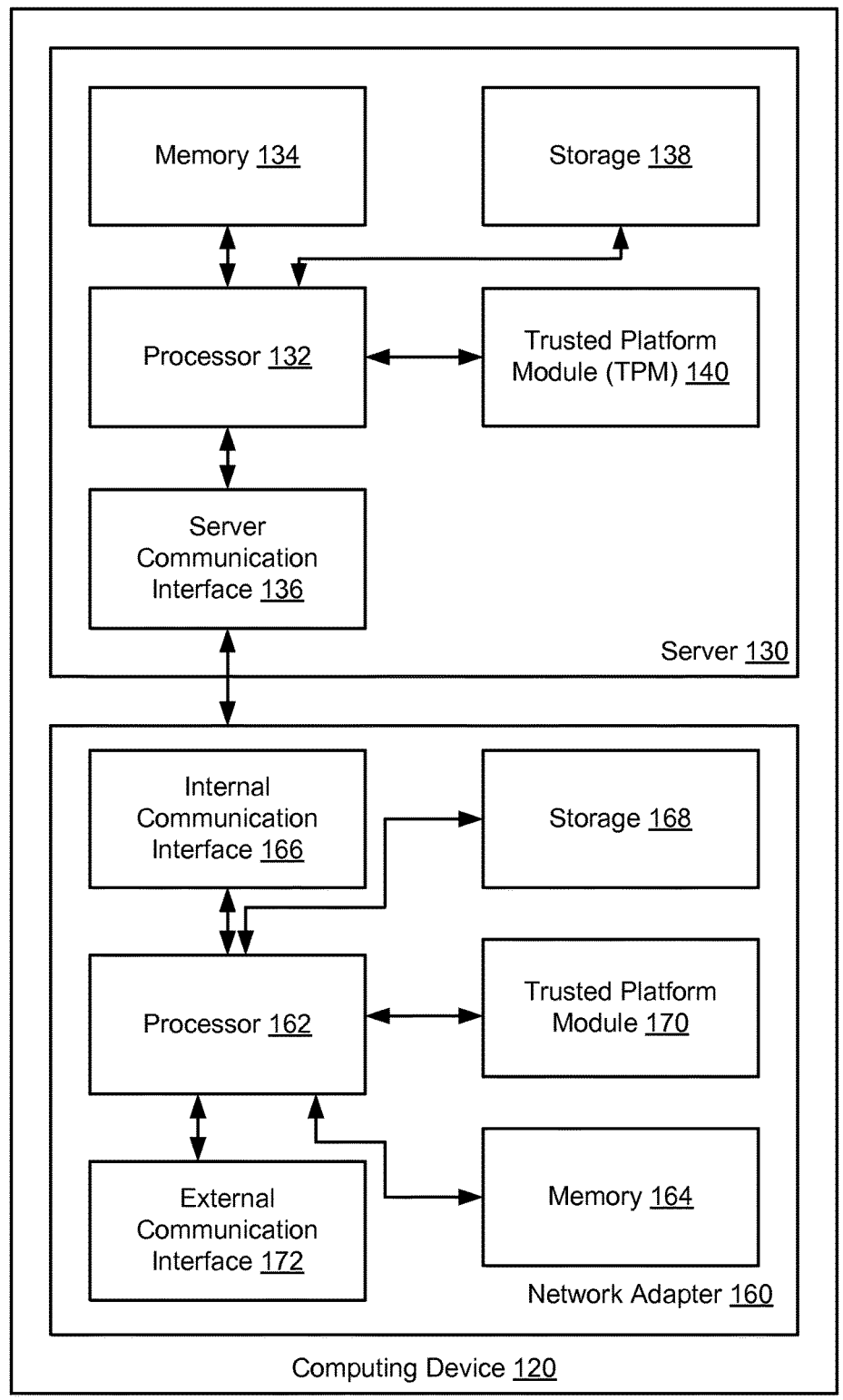

FIG. 1B shows a system in accordance with one or more embodiments of the invention. In one or more embodiments of the invention, computing device (120) includes two components: a server (130) and a network adapter (160). Each of these components is described below.

Figure 1C:
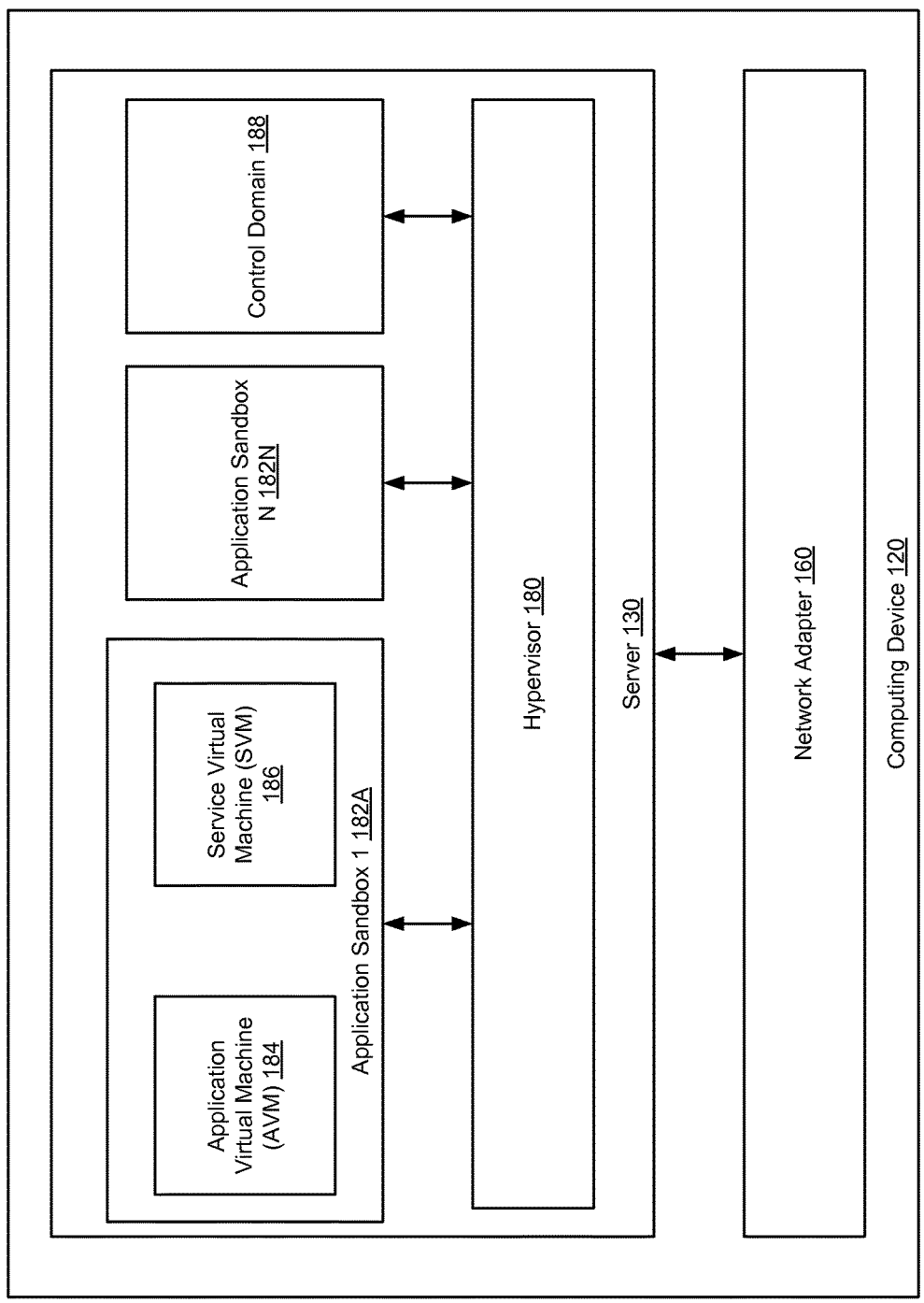

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including 3$^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain.

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
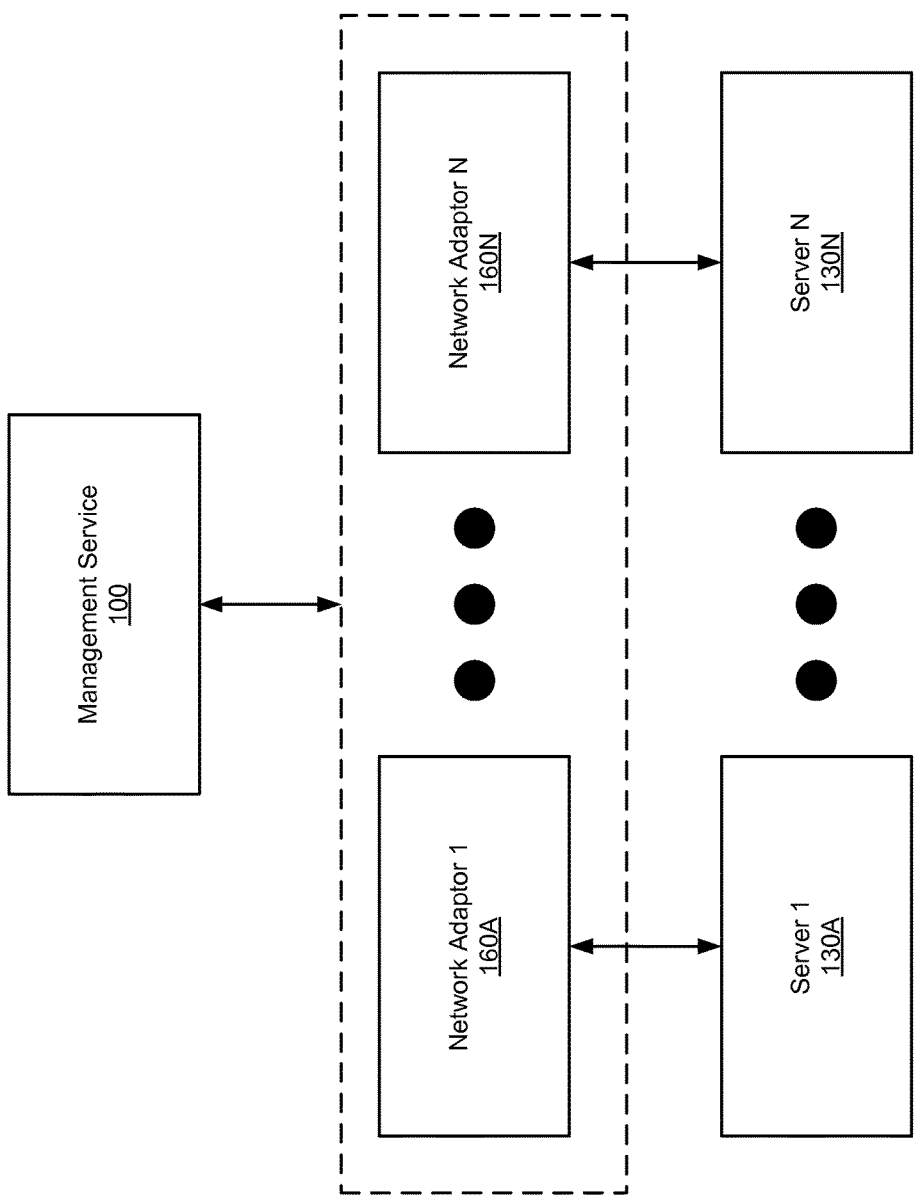
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
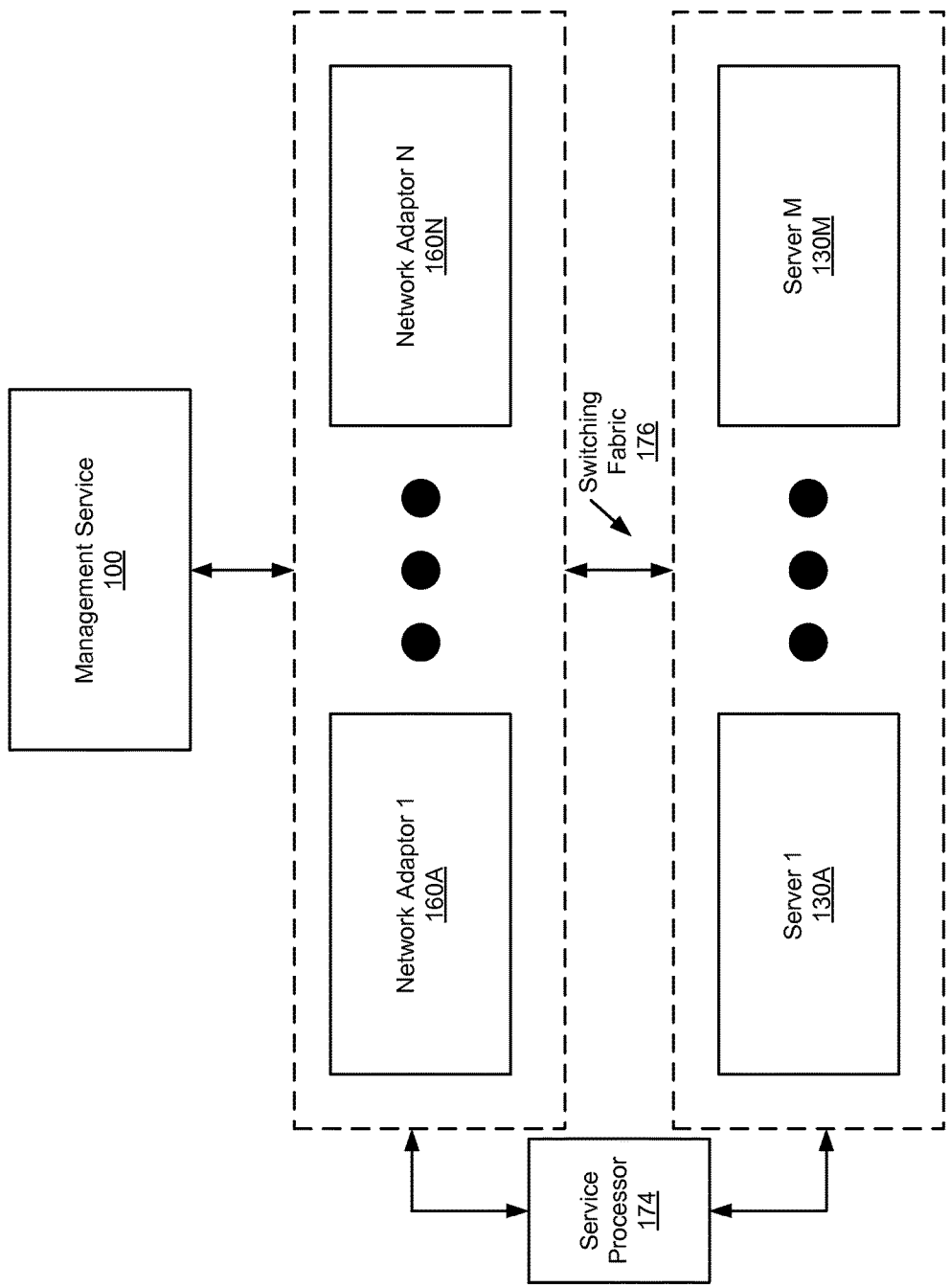
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may require the use of one or more keys. In such scenarios, embodiments of the invention include mechanisms to secure the one or more keys in a key store.

In one embodiment of the invention, a key is a piece of data that may be used, for example, to: encrypt data, decrypt data, grant access to a resource, authenticate a user, etc. The key may be in any format, include any type of content (e.g., numbers, letters, symbols, etc.) and be of any length, e.g., a 128-bit value, 256-bit value, etc. Further, the key may be derived from other data. For example, a key may be derived from biometric data for an user and/or from a random number obtained from a random number generator. In one embodiment of the invention, the key may be a symmetric key. Alternatively, the key may be a private or public key that is part of a private-public key pair.

Figure 4:
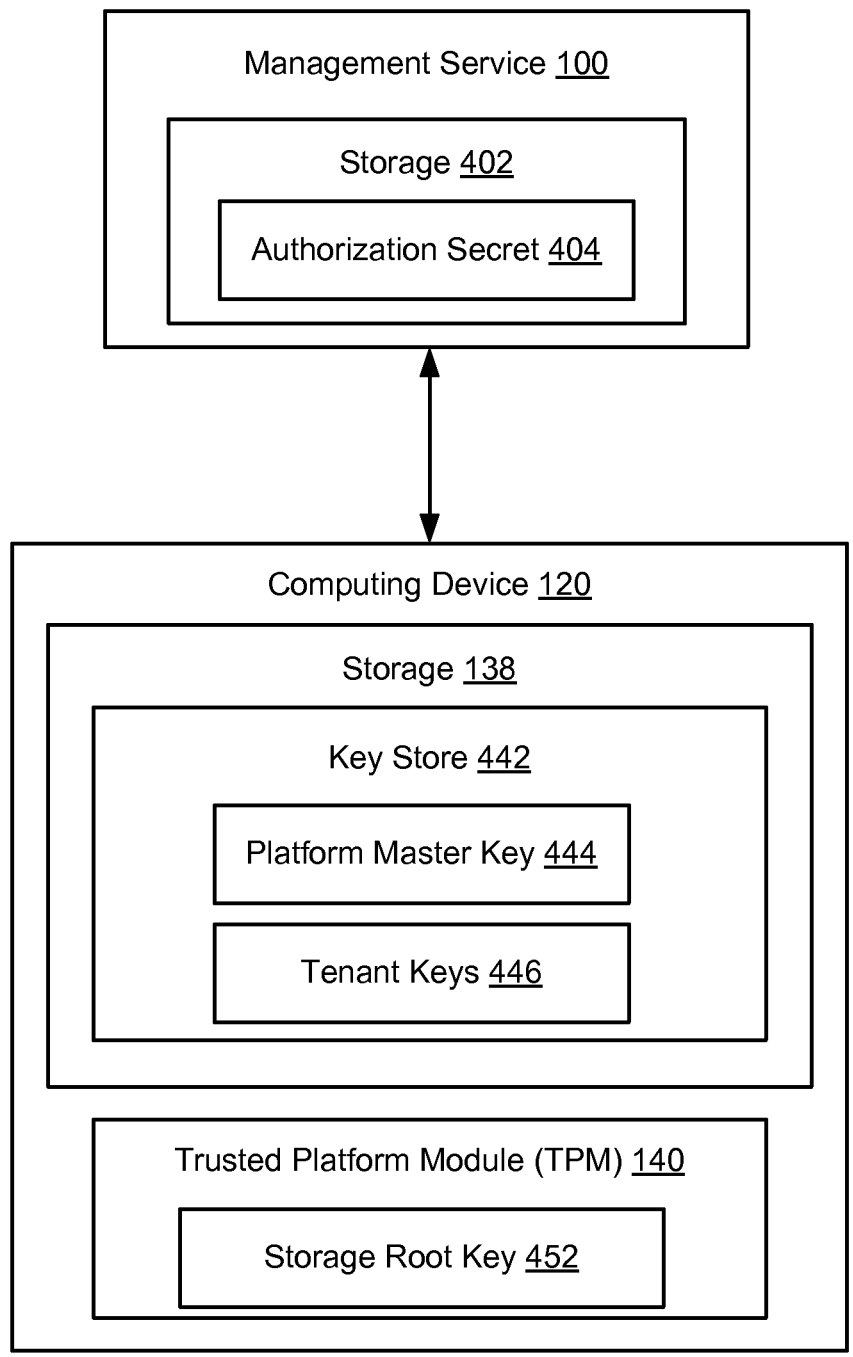
FIG. 4 shows a system in accordance with one or more embodiments of the invention.

FIG. 4 shows various components of the system previously described in FIGS. 1A-3 that may be used to protect one or more keys in accordance with one or more embodiments of the invention. The other components of the system (while present) are omitted from FIG. 4 for purposes of clarity.

Turning to FIG. 4, in one or more embodiments of the invention, the management service (100) (described above) includes and/or has access to storage (402). The storage (402) corresponds to any persistent (non-volatile) storage. The storage (402) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one or more embodiments of the invention, an authorization secret (404) may be stored in the storage (402) of the management service (100). In one embodiment of the invention, the authorization secret may be, for example, a random number and/or a string of characters (e.g., any combination of letters, numbers, and/or symbols). The use of the authorization secret (404) is described below.

As discussed above, the computing device (120) may include one or more keys. For example, the computing device may include, in storage (138), a platform master key (444) and one or more tenant keys (446) (which may include both tenant keys and tenant master keys).

In one embodiment of the invention, the platform master key (444) is a key generated by the TPM (140). The platform master key (444) may be, for example, a private key that is part of a public-private key pair. Alternatively, the platform key may be a symmetric key. In one embodiment of the invention, a tenant key (446) is a key that is associated with a tenant or a portion of tenant (i.e., a portion of the tenant's data or resources). In one embodiment of the invention, a tenant corresponds to a person or a legal entity (or a portion of a legal entity). Examples of legal entities include, but are not limited to, a corporation, partnership, professional organization, and a joint venture, etc. Examples of portions of legal entities may include, but are not limited to, a division of a legal entity, a project group within the legal entity, a product group within the legal entity, and a group of users that are employed by the legal entity. In one embodiment of the invention, a tenant may be a separate and isolated software application executing, for example, in an AVM (184) on the computing device (120). The software application may be separate and protected from other tenant applications that might also be executing on the computing device (120). Each tenant may get its own resources, e.g., storage space, that may be encrypted by the tenant's tenant key(s) (446), such that there may be no possibility for data leakage or loss, tenant to tenant, on a single computing device (120).

Continuing with the discussion of FIG. 4, in one embodiment of the invention, the key store (442) may correspond to one or more files and/or one or more directories. Further, the key store (442) may be located in a single location within the computing device or may be distributed across different locations in the computing device. In one or more embodiments of the invention, when the keys are not in use (see e.g., FIGS. 6 and 7), the keys in the key store may be stored in an encrypted form. In such cases, the keys may need to be decrypted prior to being used (see e.g., FIG. 6). By storing the keys in the key store in encrypted form, there is a decreased risk that the keys in the key store may be compromised (or otherwise obtained and used without authorization).

In one or more embodiments of the invention, the trusted platform module (TPM) (140)(described above) of the computing device (120) includes a storage root key (452) that is stored in the hardware of the TPM (140) in a manner such that it cannot be extracted from the hardware of the TPM (140). In one embodiment of the invention, the storage root key (452) is a key that may be used for the encryption and/or decryption of other keys. In one embodiment of the invention, these other keys may be designated for specific purposes, such as, for example, encrypting other keys or arbitrary data. The storage root key (452) may be, for example, a public-private key pair. In one embodiment of the invention, the storage root key (452) may not leave the TPM (140). Accordingly, any keys that have been encrypted using the storage root key (452) may only be decrypted inside the TPM (140) using the storage root key (452). Other keys, including keys generated by the TPM, for example, keys used to encrypt and/or decrypt arbitrary data, may leave the TPM.

In one embodiment of the invention, the key store may store a hierarchy of keys (also referred to as key tree). Each of the keys in the key tree may correspond to a symmetric key or a private key (of a public-private key pair). In general, the leaf keys in the key tree may be used to encrypt data while the intermediate keys and the root key (e.g., the storage root key) may only be used to encrypt other keys in the key tree. Non-limiting examples of key trees are shown in FIGS. 5A-5B.

Figure 5A:
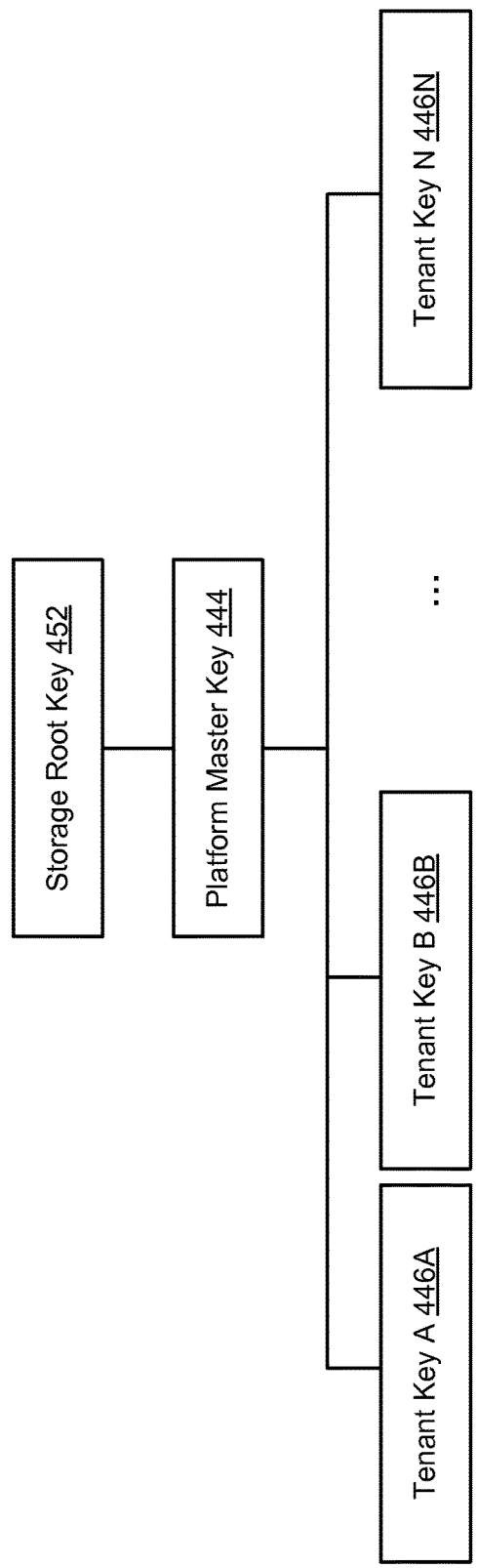
FIGS. 5A and 5B show systems in accordance with one or more embodiments of the invention.

Turning to FIG. 5A, FIG. 5A shows a key tree that includes a set of tenant keys A-N (446A-446N), a platform master key (444), and a storage root key (452). Tenant keys A-N (446A-446N) may be encrypted using platform master key (444). The platform master key (444) may be encrypted using the storage root key (452) of the TPM (140) (not shown). Accordingly, keys may be hierarchically organized such that a tenant key (446) may only be decrypted using the platform master key (444) located immediately above, in the hierarchy, which in turn requires decryption by the storage root key (452). In one embodiment of the invention, each of the tenant keys (446A-446N) may be associated with the same or different tenants.

Figure 5B:
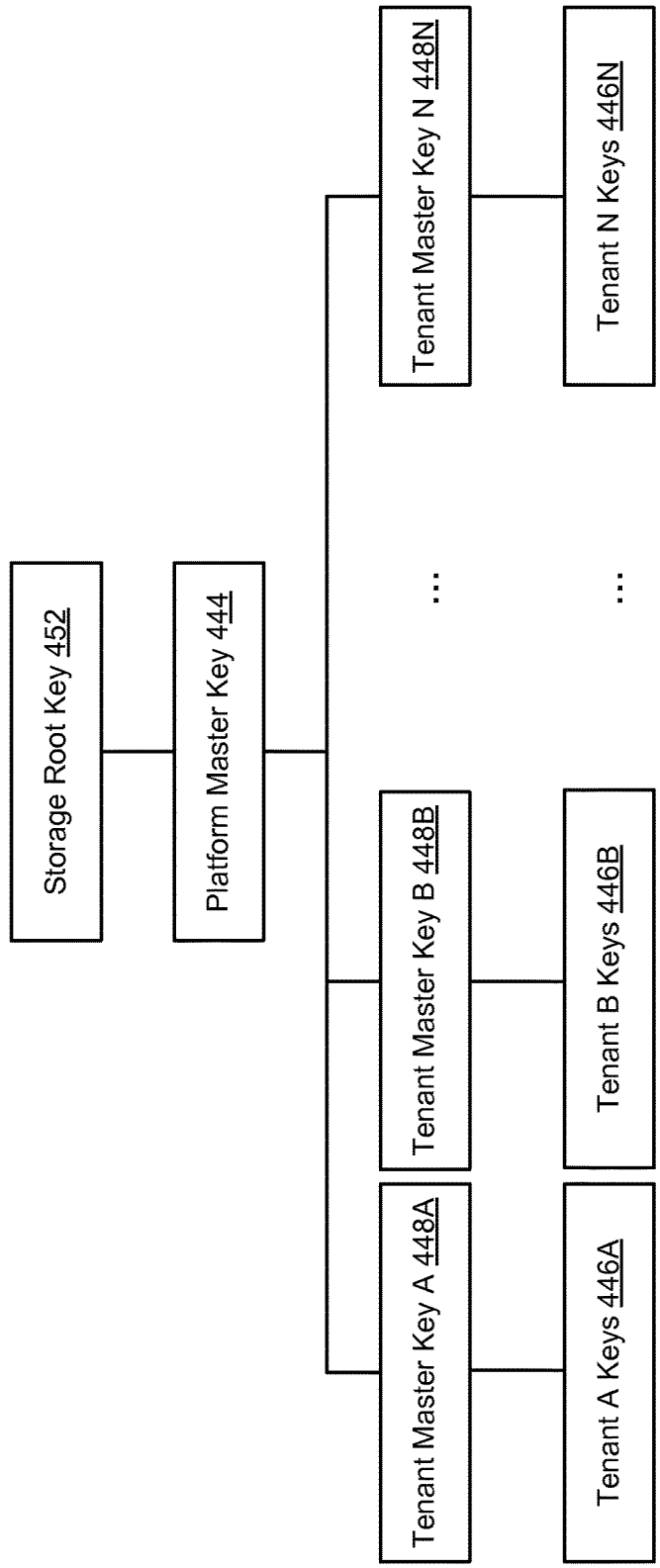

Turning to FIG. 5B, FIG. 5B shows a key tree that includes a set of tenant keys A-N (446A-446N), a set of tenant master keys (448A-448N), a platform key, and a storage root key (452). Each group of tenant keys (446) may be encrypted by a corresponding tenant master key (448A-448N). Each of the tenant master keys may be encrypted by the platform master key (444). Finally, the platform master key (444) may be encrypted by a storage root key (452).

In one embodiment of the invention, each of the tenant keys (446A-446N), grouped under a particular tenant master key (448A-448N), may be associated with the same tenant. For example, all tenant keys (446A) that are leaf keys of a tenant master key A (448A) may be associated with tenant A, whereas all tenant keys (446B) that are leaf keys of tenant master key B (448B) may be associated with tenant B.

One skilled in the art will recognize that the architecture of a system is not limited to the components shown in FIGS. 1A-5B. For example, the system may include multiple computing devices, a computing device may include multiple application sandboxes, and an application sandbox may include multiple applications. In addition, the key store (442) may include additional hierarchies of encryption keys not shown in FIGS. 5A and 5B. In one embodiment of the invention, the key store (442) supports arbitrary hierarchies of encryption keys. For example, the key store (442) may simultaneously provide a flat hierarchy of keys for one tenant, and a deep hierarchy of keys for another tenant. The depth of a given key tree and the number of keys at each level of a given key tree may vary based on the implementation of the invention.

Figure 6:
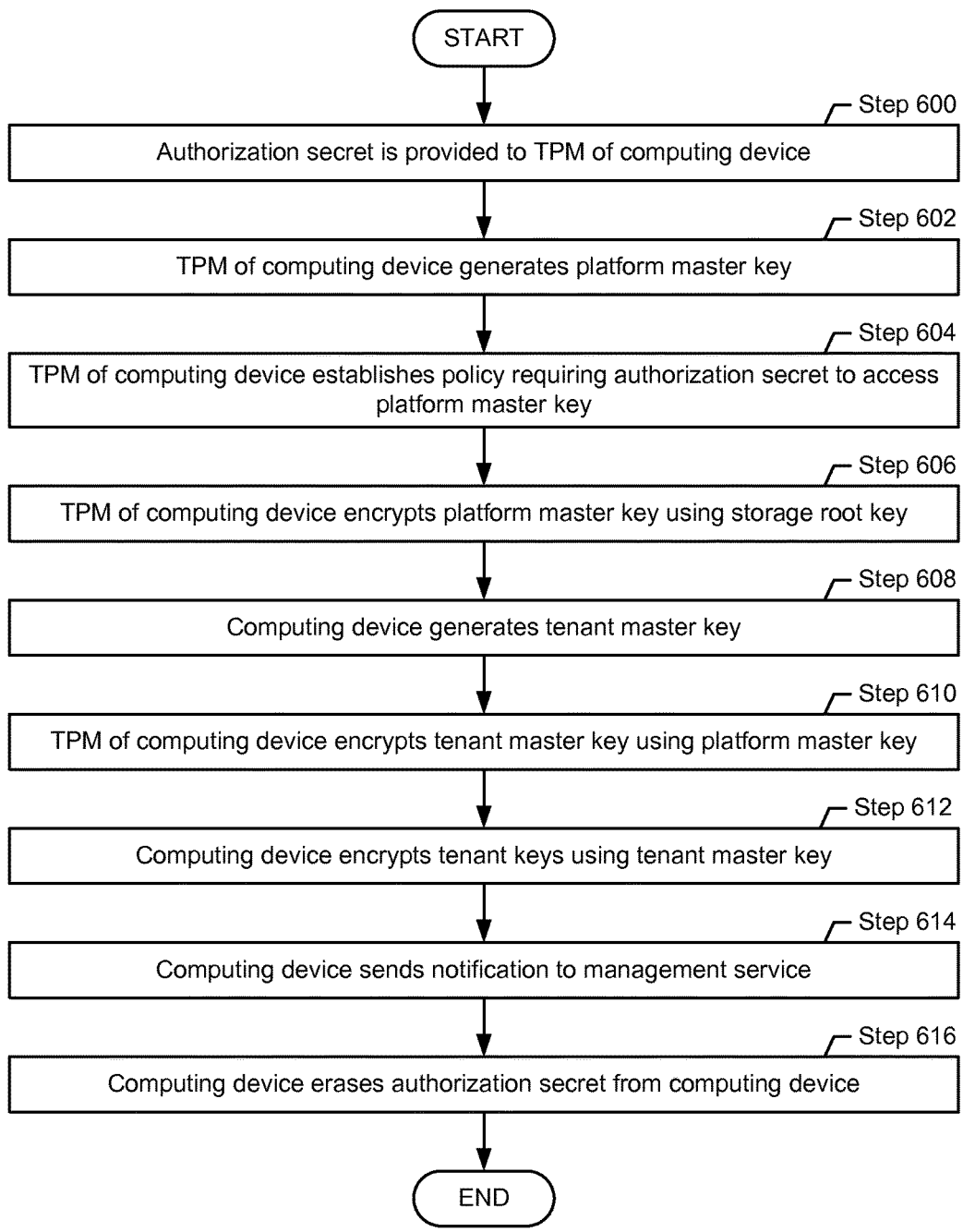
FIG. 6 shows a flowchart in accordance with one or more embodiments of the invention.
Figure 7:
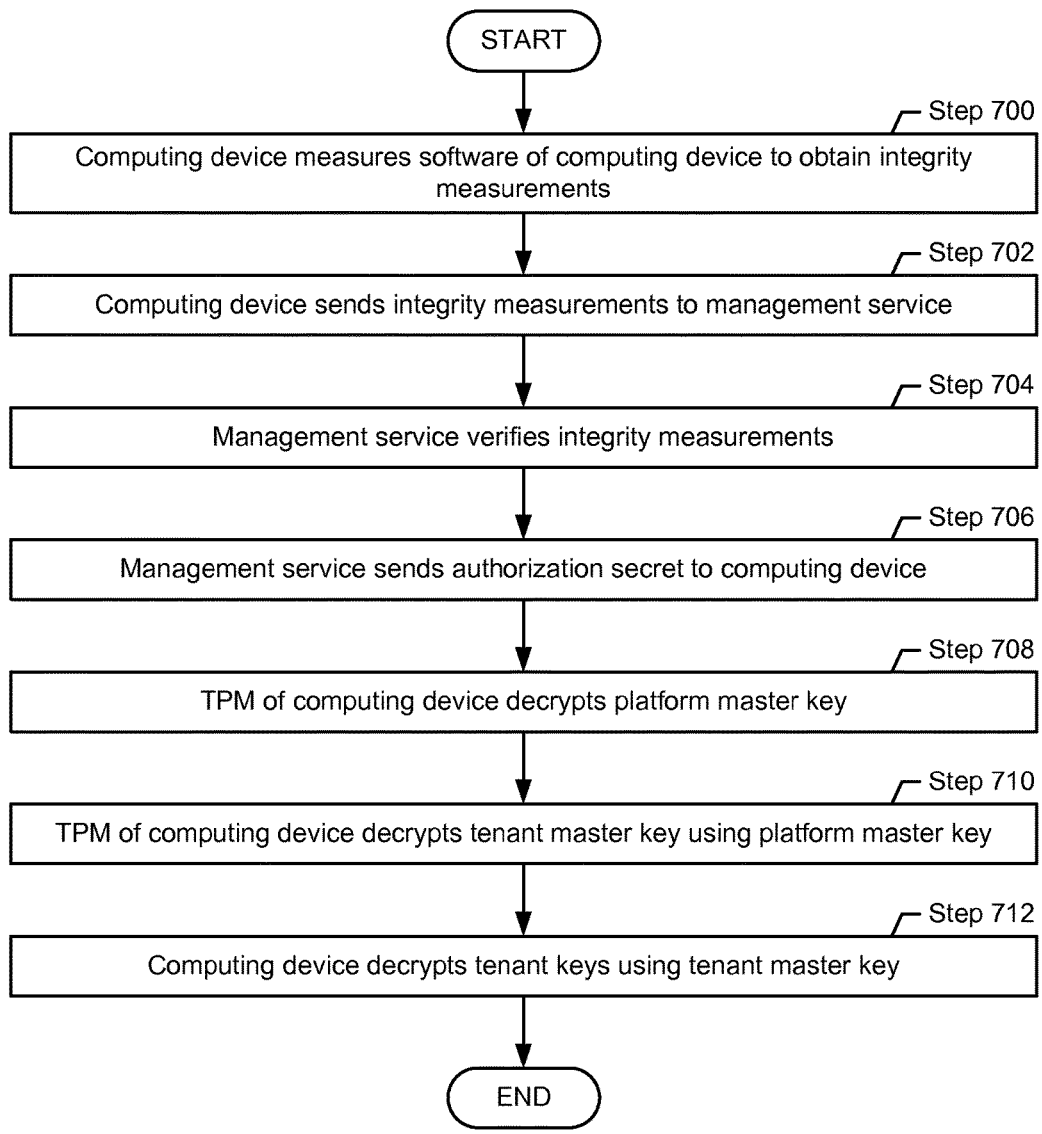
FIG. 7 shows a flowchart in accordance with one or more embodiments of the invention.

FIGS. 6 and 7 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one or more embodiments of the invention, the steps shown in FIGS. 6 and 7 may be performed in parallel with any other steps shown in FIGS. 6 and 7 without departing from the invention.

FIG. 6 shows a method for populating a key store with keys. The method may be executed when a new key or a set of new keys to be protected becomes available, or when an existing key is modified or exchanged, for example, during the initial setup of the computing device, when a new application is installed on the computing device, and/or when any other change is made to the computing device that results in the addition or exchange of a key or a set of keys. Prior to performing the steps shown in FIG. 6, the management service may have verified the integrity of the computing device, as previously described. In one or more embodiments of the invention, all or a portion of the steps described in FIG. 6 may only be executed in the control domain, thus further isolating and protecting the keys in the key store from potentially compromised applications or services running on the computing device in the AVM or SVM.

Turning to FIG. 6, in Step 600, an authorization secret is provided to the trusted platform module (TPM) of the computing device. In one embodiment of the invention, as previously described, the authorization secret may be generated by the random number generator of the computing device's processor. Alternatively, in one embodiment of the invention, the authorization secret may be generated by the management service, and the management service may send the authorization secret to the computing device. The transmission of the authorization secret may be protected by encryption. The computing device having received the authorization secret, may forward the authorization secret to the TPM.

In Step 602, the TPM, after receiving the authorization secret, generates the platform master key. In Step 604, the TPM establishes a policy that requires the receipt of the authorization secret by the TPM before granting access to the platform master key (i.e., before decryption of the platform master key which may be encrypted while not being used, as described in FIG. 7).

In Step 606, the TPM of the computing device encrypts the platform master key using the storage root key of the TPM. In one or more embodiments of the invention, the encryption of the platform master key may only be performed inside the TPM. In one embodiment of the invention, the platform master key includes a public-private pair of keys. The public half of the key may be used for encryption, whereas the private half of the key may be used for decryption. In one embodiment of the invention, only the private half of the platform master key is encrypted using the storage root key, whereas the public half of the key remains unencrypted.

In Step 608, a tenant master key is generated. In one or more embodiments of the invention, the tenant master key may be generated by the TPM, or it may be generated outside the TPM. In one or more embodiments of the invention, TPM may be configured to ensure that the tenant master key does not leave the TPM in an unencrypted form. In one or more embodiments of the invention, multiple tenant master keys may be generated, and/or hierarchies of tenant master keys may be generated. Further, in one or more embodiments of the invention, no tenant master key may be generated if the tenant keys are directly encrypted by the platform master key.

In Step 610, the TPM of the computing device encrypts the tenant master key(s) using the platform master key. In one or more embodiments of the invention, the encryption of the tenant master key(s) may only be performed inside the TPM. In one embodiment of the invention, there may be no tenant master key(s). In this case, the tenant keys may be directly encrypted by the platform master key. The encryption of the tenant keys may only be performed inside the TPM. In one embodiment of the invention, a tenant master key includes a public-private pair of keys. The public half of the key may be used for encryption, whereas the private half of the key may be used for decryption. In one embodiment of the invention, only the private half of the tenant master key is encrypted using the platform master key (more specifically, using the public half of the platform master key), whereas the public half of the tenant master key remains unencrypted.

In Step 612, the tenant keys (also referred to as the leaf keys), are encrypted by the tenant master key(s) (or by another key that it directly above the leaf keys in the key tree). The tenant keys may be obtained and/or generated at any point prior to Step 612. In one or more embodiments of the invention, the encryption of the tenant keys may be performed by the TPM, for example, if the decrypted tenant master key is configured not to leave the TPM. Alternatively, the encryption of the tenant keys may be performed outside the TPM, for example, if the tenant master key was generated outside the TPM. In one or more embodiments of the invention, there may be no tenant master key(s), and accordingly the tenant keys may be directly encrypted by the platform master key, as described in Step 610.

In Step 614, the computing device sends a notification to the management service. The notification may serve as a confirmation that all keys in the key store on the computing device have been encrypted. In one or more embodiments of the invention, if the authorization secret has been generated on the computing device (Step 600), the notification, sent from the computing device to the management service, includes the authorization secret. The authorization secret may be protected by encryption before sending the authorization secret to the management service.

In Step 616, the computing device maintains a copy of the authorization secret in a volatile storage (e.g., DRAM) of the computing device. The computing device may however not maintain a copy of the authorization secret in a persistent storage (e.g., hard disk drive) of the computing device. Accordingly, the authorization secret may be available for accessing the key store as long as the computing device is not shut down. After a restart of the computing device, access to the key store may be possible only if the management service approves the access by sending the authorization secret to the computing device.

While steps 606-612 in FIG. 6 describes the encryption of the keys in the key store where the trees have the key tree with three or four levels (see e.g., FIGS. 5A-5B), the method shown in FIG. 6 may be modified to support the encryption of a key tree with an arbitrary number of levels without departing from the invention.

FIG. 7 shows a method for obtaining a tenant key from the key store. The method may be executed when a tenant key, safeguarded by the key store is requested. In one or more embodiments of the invention, the method may only be executed if the requesting process or service is authorized to obtain the tenant key. In one or more embodiments of the invention, all or a portion of the steps described in FIG. 7 may only be executed in the control domain, thus further isolating and protecting the keys in the key store from potentially compromised applications or services running on the computing device.

Turning to FIG. 7, in Step 700, the computing device, as part of the booting process after powering on the computing device, obtains integrity measurements for various portions of the software on the computing device (described above). In one embodiment of the invention, the integrity measurements are signed by the TPM of the computing device, thereby guaranteeing the authenticity of the integrity measurements. In Step 702, the computing device sends the integrity measurements to the management service.

In Step 704, the management service verifies the integrity measurements (described above). In one or more embodiments of the invention, the management service may confirm the measurements by comparing the integrity measurements received from the computing device to a set of expected integrity measurements stored in (or accessible to) the management service. In one embodiment of the invention, the management service may further verify the computing device TPM signature of the integrity measurements to verify the authenticity of the integrity measurements received in Step 702.

In Step 706, when the management service successfully verifies the integrity measurements and ultimately verifies the integrity of the computing device, the management service sends the authorization secret to the computing device. The management service may not send the authorization secret to the computing device if integrity verification fails. In one or more embodiments of the invention, the transmission of the authorization secret from the management service to the computing device may be protected by encryption.

In Step 708, the TPM of the computing device, e.g., in accordance with the policy established in Step 604, after having received the authorization secret, and after having verifying that the authorization secret is correct, loads the platform master key from the storage of the computing device and decrypts the platform master key using the storage root key of the TPM. In one or more embodiments of the invention, the TPM keeps the decrypted platform master key inside the TPM. If an incorrect authorization secret is received from the management service, the method may end.

In Step 710, the TPM of the computing device loads the tenant master key necessary for the decryption of the requested tenant key from the storage of the computing device and decrypts the tenant master key using the platform master key. In one or more embodiments of the invention, the TPM keeps the decrypted tenant master key inside the TPM. Accordingly, a tenant key may only be decrypted within the TPM. Alternatively, in one or more embodiments of the invention, the decrypted tenant master key may leave the TPM. Accordingly, in this scenario, a tenant key may be decrypted by software outside the TPM. Further, in one or more embodiments of the invention, a tenant master key may not be used to protect the requested tenant key. In this case, step 710 may not be performed, and the protected tenant key may be directly decrypted using the platform master key.

In Step 712, the computing device decrypts the requested tenant key. In one or more embodiments of the invention, the tenant master key may be used to decrypt the requested tenant key. The decryption may be performed inside the TPM if the decrypted tenant master key is kept within the TPM, or it may be performed outside the TPM if the decrypted tenant master key is kept outside the TPM. In one or more embodiments of the invention, a tenant master key may not be used to protect the requested tenant key. In this case, the tenant key may be decrypted using the platform master key inside the TPM. In one or more embodiments of the invention, the decryption of tenant keys may be performed only as needed, i.e., only the tenant key that has been requested may be decrypted, whereas all other keys may remain encrypted. Further, in one or more embodiments of the invention, decrypted keys that are currently not needed for decryption of other keys and/or data may be deleted from the computing device. For example, the decrypted copy of the tenant master key may be deleted after decryption of the tenant key.

Once step 712 is performed, the tenant key (in its decrypted form) may then be used to decrypt various data in the system.

In one embodiment of the invention, the authorization secret may be kept in the memory of the computing device to be available for authorizing a subsequent decryption of the platform master key when another tenant key is requested. Accordingly, subsequent decryptions of tenant keys may be performed by completing Steps 708-712. In one embodiment of the invention, the authorization secret is stored in an area of memory that is only accessible by services running in the control domain. Alternatively, in one embodiment of the invention, the authorization secret is stored in a location accessible only by the hypervisor (i.e., a protected storage location), such as a debug register of the server's processor or a memory enclave protected by the processor. The memory enclave may be encrypted by the processor, and may not be accessible using direct memory access (DMA), thereby impeding unauthorized access. Further, the hypervisor of the computing device may only accept requests to access the authorization secret stored in the debug register and/or a memory enclave if the requests are from services running within the control domain. The authorization secret may therefore be retrieved from either the memory of the computing device, from the debug register of the processor, and/or from a memory enclave protected by the processor to unlock the key store when a subsequent request for a tenant key is received.

The use case scenarios described below are intended to provide examples of the method for key management, described in FIGS. 6 and 7. The use case scenarios are based on the system shown in FIGS. 1A-1C and are for illustrative purposes only. The method described by FIGS. 6 and 7 is not limited to the system shown in FIGS. 1A-1C, but rather is universally applicable to a wide range of systems, including, for example the systems shown in FIGS. 2 and 3.

Example Use Case 1

Consider a scenario in which an application hosted by the AVM (184) requires a key to access an encrypted file system. Accordingly, when the application was deployed on the computing device (120), an application manifest, describing the permissions and privileges of the application, specified that the application has permission to obtain the key. In this scenario, the application hosted by the AVM (184) is the only application that is authorized to obtain the key. When the application requires access to the encrypted file system, it sends a request for the key to the control domain (188), via the SVM (186). The control domain confirms, based on the configuration in the application manifest, that the application is authorized to receive the key and performs the steps described in FIG. 7, and subsequently returns the key to the application, via the SVM (186), thus allowing the application hosted by the AVM (184) to access the encrypted file system. In contrast, any other application attempting to obtain the key, will not receive the key, because the application hosted by the AVM (184) is the only application authorized to obtain the key.

Example Use Case 2

Consider a scenario in which an application hosted by the AVM (184) requires a key to access an encrypted file system. Accordingly, when the application was deployed on the computing device (120), an application manifest describing the permissions and privileges of the application was configured to include the permission to obtain the key. In this scenario, however, the AVM (184) hosting the application and the SVM (186) are configured to isolate the key from the application. The isolation is accomplished by having a proxy, hosted by the SVM (186), access the encrypted file system in lieu of the application hosted by the AVM (184). When the application requires access to the encrypted file system, it sends a request for the key to the control domain (188), via the SVM (186). The control domain confirms that the SVM (186) is authorized to receive the key, performs the steps described in FIG. 7, and subsequently returns the key to the SVM (186), thus enabling the proxy hosted by the SVM (186) to access the encrypted file system, and allowing the proxy to provide data from the encrypted resource to the application, without exposing the key to the application. The SVM (186) is configured to delete the key after completing the task, thereby ensuring that no unauthorized copies of the key can be made. The SVM (186) may also include functionality to delete the key upon request.

Embodiments of the invention may enable a computing device to safely store a key or a set of keys in a manner that does not require the attendance of a local system administrator. The keys may be protected by a key store that may be accessed only if the integrity of the computing device has been verified. Accordingly, keys may not be extracted by malicious software that has been injected into the computing device in order to obtain the keys. The key store may further be accessed only with the approval of an external management service. Accordingly, keys may not be extracted from the key store, if the computing device is removed from its environment for an extensive attack on the key store.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for key management, the method comprising:
obtaining, by a control domain on a server, an authorization secret from a management service, wherein the management service is external to the server;
generating, after obtaining the authorization secret, a platform master key;
encrypting a tenant key with the platform master key to obtain an encrypted tenant key;
encrypting the platform master key using a storage root key to obtain an encrypted platform master key;
storing the encrypted tenant key and the encrypted platform master key in a key store on the server;
removing the authorization secret from the server;
after removing the authorization secret from the server;
receiving, by the control domain, a request for the tenant key;
obtaining the authorization secret from the management service;
in response to the request:
decrypting, after obtaining the authorization secret, the encrypted platform master key to obtain the platform master key;
decrypting the encrypted tenant key to obtain the tenant key using the platform master key; and
providing the tenant key to an entity that issued the request.

2. The method of claim 1, further comprising:
providing at least one integrity measurement for the server to the management service prior to obtaining the authorization secret.

3. The method of claim 1, further comprising:
providing at least one integrity measurement for the server to the management service prior to receiving the request and prior to obtaining the authorization secret, wherein the control domain is executing on the server.

4. The method of claim 1, wherein decryption of the encrypted tenant key to obtain the tenant key using the platform master key is performed in a trusted platform module (TPM), wherein the TPM is located on the server.

5. The method of claim 1, wherein decrypting the encrypted tenant key comprises;
decrypting an encrypted tenant master key to obtain a tenant master key; and
decrypting the encrypted tenant key using the tenant master key.

6. The method of claim 1, wherein the encrypted platform master key is decrypted using the storage root key in a trust platform module (TPM), wherein the TPM is located on the server.

7. The method of claim 1, wherein the entity is an application executing in an application virtual machine (AVM) and wherein AVM is executing on the server.

8. The method of claim 1, wherein the entity is a proxy executing a service virtual machine (SVM) and the SVM is executing on the server.

9. The method of claim 1, wherein obtaining the authorization secret comprises generating the authorization secret by a random number generator on the server.

10. The method of claim 1, wherein obtaining the authorization secret comprises obtaining the authorization secret from the management service.

11. The method of claim 1, further comprising:
after obtaining the authorization secret, storing the authorization secret in a protected storage location in the server.

12. The method of claim 1, further comprising:
after obtaining the authorization secret, storing the authorization secret in memory in the server.

13. A system, comprising:
a server comprising:
storage, wherein the storage comprises a key store,
a first trusted platform module (TPM);
a control domain executing on the server configured to:
receive a request for a tenant key, wherein an encrypted tenant key is stored in the key store;
obtain an authorization secret from a management service, wherein the management service is external to the server;
in response to the request:
initiate, after obtaining the authorization secret, decryption of an encrypted platform master key by the first TPM in order to obtain a platform master key, wherein the encrypted platform master key is stored in the key store;
initiate decryption of the encrypted tenant key to obtain the tenant key using the platform master key; and
provide the tenant key to an entity that issued the request;
wherein the server is configured to provide at least one integrity measurement for the server to the management service prior to obtaining the authorization secret, and a network adaptor operatively connected to the server comprising a second TPM,
  wherein the network adaptor is configured to provide at least one integrity measurement for the network adaptor to the management service prior to obtaining the authorization secret.

14. The system of claim 13, wherein the entity is an application executing in an application virtual machine (AVM) and wherein AVM is executing on the server.

15. The system of claim 13, wherein the entity is a proxy executing a service virtual machine (SVM) and the SVM is executing on the server.

16. The system of claim 13, further comprising:
  a debug register on a processor in the server configured to store the authorization secret.

17. A non-transitory computer readable medium comprising computer readable program code, which when executed by a computer processor enables the computer processor to:
  obtain, by a control domain on a server an authorization secret from a management service, wherein the management service is external to the server;
  generate, after obtaining the authorization secret, a platform master key;
  encrypt a tenant key with the platform master key to obtain an encrypted tenant key;
  encrypt the platform master key using a storage root key to obtain an encrypted platform master key;
  store the encrypted tenant key and the encrypted platform master key in a key store on the server;
  remove the authorization secret from the server;
  after removing the authorization secret from the server;
    receive, by the control domain, a request for the tenant key;
    provide at least one integrity measurement for the server to the management service prior to receiving the request and prior to obtaining the authorization secret;
    obtain the authorization secret from the management service;
  in response to the request:
    decrypt, after obtaining the authorization secret, the encrypted platform master key to obtain the platform master key;
    decrypt the encrypted tenant key to obtain the tenant key using the platform master key; and
    provide the tenant key to an entity that issued the request.

* * * * *

UNITED STATES PATENT AND TRADEMARK OFFICE
CERTIFICATE OF CORRECTION

PATENT NO. : 9,680,805 B1
APPLICATION NO. : 14/705887
DATED : June 13, 2017
INVENTOR(S) : Robert Stephen Rodgers et al.

Page 1 of 1

It is certified that error appears in the above-identified patent and that said Letters Patent is hereby corrected as shown below:

In the Claims

Claim 17, Column 17, Line 19 reads "...obtain, by a control domain on a server an authorization..." but should read -- ...obtain, by a control domain on a server, an authorization... --.

Signed and Sealed this
Twelfth Day of September, 2017

Joseph Matal
*Performing the Functions and Duties of the
Under Secretary of Commerce for Intellectual Property and
Director of the United States Patent and Trademark Office*